United States Patent [19]

Ishiyama et al.

[11] Patent Number: 4,972,207

[45] Date of Patent: Nov. 20, 1990

[54] THERMAL PRINTING DEVICE FOR FEEDING TIGHTLY STRETCHED PAPER

[75] Inventors: Kiyoshige Ishiyama, Mie; Hiromitsu Ogita, both of Mie, Japan

[73] Assignee: Shinko Denki Kabushiki Kaisha, Tokyo, Japan

[21] Appl. No.: 369,400

[22] Filed: Jun. 21, 1989

[30] Foreign Application Priority Data

Jun. 23, 1988 [JP] Japan .................................. 63-82393

[51] Int. Cl.[5] .............................................. G01D 15/10

[52] U.S. Cl. ................................ 346/76 PH; 400/120

[58] Field of Search .................... 346/76 PH; 400/120

[56] References Cited

FOREIGN PATENT DOCUMENTS 0086274 5/1986 Japan .............................. 346/76 PH 0187752 11/1987 Japan .

*Primary Examiner*—Bruce A. Reynolds

*Assistant Examiner*—Huan Tran

*Attorney, Agent, or Firm*—Armstrong, Nikaido, Marmelstein, Kubovcik & Murray

[57] ABSTRACT

A thermal printing system of this type is able to obviate loosening of the paper sheet stock during its feeding step prior to printing, and thereby to prevent crumpling of the paper and information of misaligned print from occuring. A thermal printing system capable of performing aforesaid function can be achieved by making the printing system as such one comprising, a platen, a pair of pinch rollers one end of each of which is rotaably supported by each one of a pair of pinch roller levers and is resiliently biased by a pinch roller lever tensioning spring so that each pinch roller can be brought into tight contact with aforesaid platen, and a paper stock holding cassette case attached with a paper feed roller for feeding paper stock for printing, in which the peripheral speed of the platen is set higher than that of the paper feed roller of the paper holding cassette. By virtue of this improved construction, the feed roller attached to the paper holding cassette is utilized as a type of brake means for imparting back tension for the purpose of stretching the sheet of paper being fed.

3 Claims, 5 Drawing Sheets

THERMAL PRINTING DEVICE FOR FEEDING TIGHTLY STRETCHED PAPER

BACKGROUND OF THE INVENTION

1. Field of the Invention:

The present invention relates to a thermal printing system, and more particularly, to a thermal printing system having a platen, which squeezes a paper sheet stock between a thermal head and said platen itself and capable of setting the peripheral speed of the platen higher than that of the paper feed roller in the system, thereby the paper feed roller of the cassette case can be used as a kind of brake, so that the feed roller can be utilized as a means for stretching the paper stock being propelled by passing over the bottom of the platen.

2. Description of the Prior Art:

Among conventional thermal printing systems, there found such ones that comprises a platen having a construction as shown in FIG. 6. Referring to FIG. 6, numerals shown therein denote parts or components depicted in the drawing, for instance, 1 denotes a thermal head, 2 shows a platen, similarly, 3 a front pinch roller, 4 a rear pinch roller, 5 a cassette case for holding a number of cut paper sheets, 6 a paper feed roller, 7 a number of paper sheets received therein, 8 a thermal printing film, 9 a sensor for detecting if the paper to be printed is in place and 10 is a track through which a paper returns.

Transferring of cut paper sheet in the conventional thermal printing system is performed in a manner as explained below.

During the step of feeding paper stock, cut paper stock 7 is taken out from the cassette case 5 by the rotation of the paper feed roller 6 and then propelled to the front pinch roller 3. Since the platen 2 and both the front and rear pinch rollers 3 and 4 start rotation concurrent with the rotation of the feed roller 6, the sheet of cut paper 7 which has just been taken out from the cassette, is propelled due to the rotation of both the platen 2 and the front pinch roller 3 and is introduced to the gap defined between these two members.

The cut paper sheet 7 is driven to advance along the surface of the thermal head 1 while being guided by the thermal printing film 8, and then fed to the gap between the rear pinch roller 4 and the platen 2.

After the paper sheet 7 has been fed to its fullY advanced extremitY where its tail end still does not pass over the rear pinch roller 4, the fed paper sheet 7 is driven to take return path by the reverse turning of the platen 2 and is guided to enter the paper return track 10 through which the paper sheet 7 is led to its starting position ready for printing.

As explained above, the platen and relating parts of conventional thermal printing systems have such a construction and the transferring of the paper sheets are done in a manner as mentioned above, however, its function for winding fed paper sheet 7 around the platen 2 relYing on such a friction feed means was found to be quite unsatisfactory, that is, correct paper feeding has not been secured during its printing step and in paper reversing step, but it was also impossible to recover the paper sheet 7 from its loosened state and thereby resulting in misaligned printed information.

SUMMARY OF THE INVENTION

In view of the drawback in the prior art devices as explained above, an object of the present invention is to solve the problems and to provide a thermal printing system which is able to obviate loosening of the paper during its feeding step prior to printing, and therebY to prevent crumpling of the paper and information of misaligned print from occuring and can perform stable paper feeding accompanying improved print image qualitY.

A thermal printing system capable of performing the aimed function as mentioned above can be made as such one which comprises, a platen, a pair of pinch rollers one end of each of which is rotatably supported bY each one of a pair of pinch roller levers and is resilientlY biased by a pinch roller lever tensioning spring so that each pinch roller can be brought into tight contact, with aforesaid platen, and a paper stock holding cassette case attached with a paper feed roller for feeding paper stock for printing, wherein the peripheral speed of the platen is set higher than that of the paper feed roller of the paper holding casette.

By virtue of this improved construction, the feed roller attached to the paper holding cassette is utilized as a type of brake means for imparting back tension for the purpose of stretching the sheet of paper being fed, in addition, the feed roller of the paper cassette is released from its driving means immediately after the front end of the paper has been caught, that is squeezed between the pinch roller and the platen so that the friction between the paper being fed and the subsequent paper in the cassette also can be used as a brake action.

DESCRIPTION OF THE PREFERRED EMBODIMENTS

Referring now to the accompanying drawings FIGS. 1A, 1B, 1C, 2 through 5, a preferred embodiment of the thermal printing system of this invention will be explained.

Figure 6:
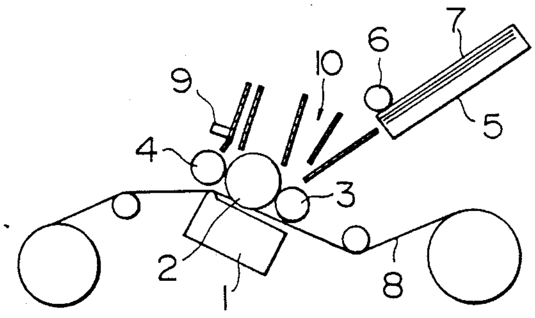
FIG. 6 PRIOR ART
FIG. 6 is a schematic side view showing a platen and its adjacent portion of a conventional thermal printing system.
Figure 7:
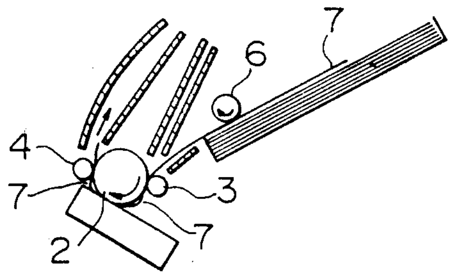
FIG. 7 PRIOR ART
FIG. 7 is a schematic side view showing that a paper being fed in the prior art printing system is in loosened state, that is, not placed under tight contact with the platen in the system.

In the aforesaid drawings depicting the present invention, like numerals are also used to represent the same parts or components given in FIGS. 6 and 7 showing the conventional thermal printing system.

Figure 1A:
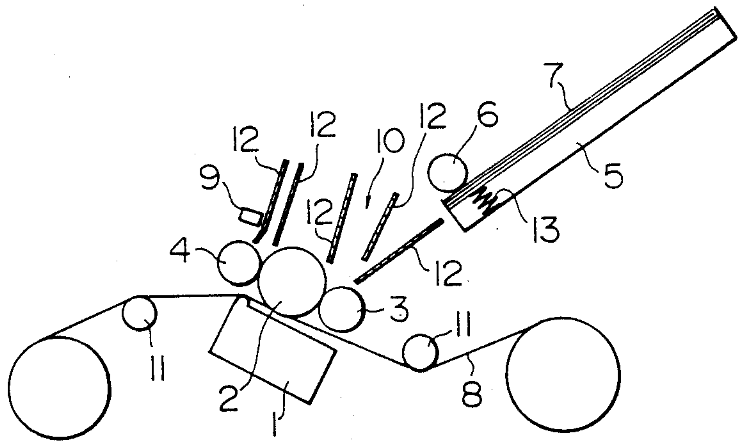
FIG. 1A is a schematic side view showing a preferred embodiment of the thermal printing system of the present invention.

FIG. 1A is a schematic side view showing a preferred embodiment of the platen including its adjacent part of the thermal printing system of the present invention, wherein following numerals represent, respectively, parts or components as described below:

Namely, numeral 1 denotes a thermal head, similarly 2 is a platen, 3 is a front pinch roller, 4, is a rear pinch roller, 5 a paper holding cassette case, 6 a paper feed roller, 7 is a cut paper sheet, 8 is a thermal printing film, 9 is a sensor for detecting the paper being fed, 10 is a track for guiding the paper in its return path, 11 is cut paper sheet, 12 is a paper guide plate and 13 is a spring.

Figure 1B:
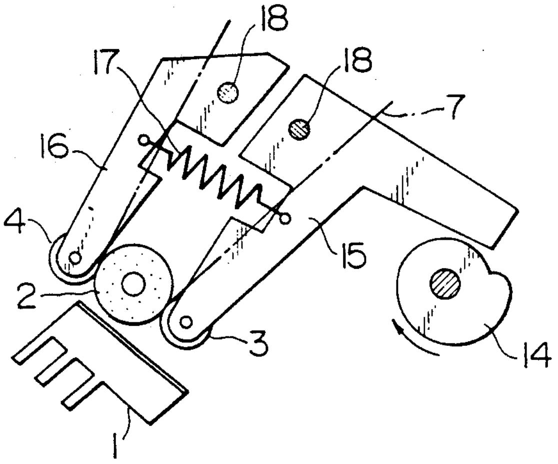
FIG. 1B is a schematic side view showing a pinch roller assembly including a front and a rear pinch rollers to be included adjacent to the platen shown in FIG. 1A.

FIG. 1B is a schematic side view showing a portion including a platen to which a front and rear pinch rollers are attached. In FIG. 1B, numeral 15 is a front pinch roller lever and 16 denotes a rear pinch roller lever, and these two roller levers are disposed being oppsitely with each other as a pair and each one end of the pinch roller levers is rotatably supported at a pinch roller supporting pin 18, while the other end as a forwarding tip end is attached, respectively, with a front pinch roller 3 and a rear pinch roller 4 both being freelY rotatable.

These pair of pinch rollers 3 and 4 are resiliently biased toward the outer periphery of the platen 2 by a pinch roller lever tension spring 17 interposed between these pair of pinch roller levers.

Numeral 14 denotes a cam which is provided so as to release the front pinch roller 3 from its resilientlY urged contact upon the surface of the platen 2.

Figure 1C:
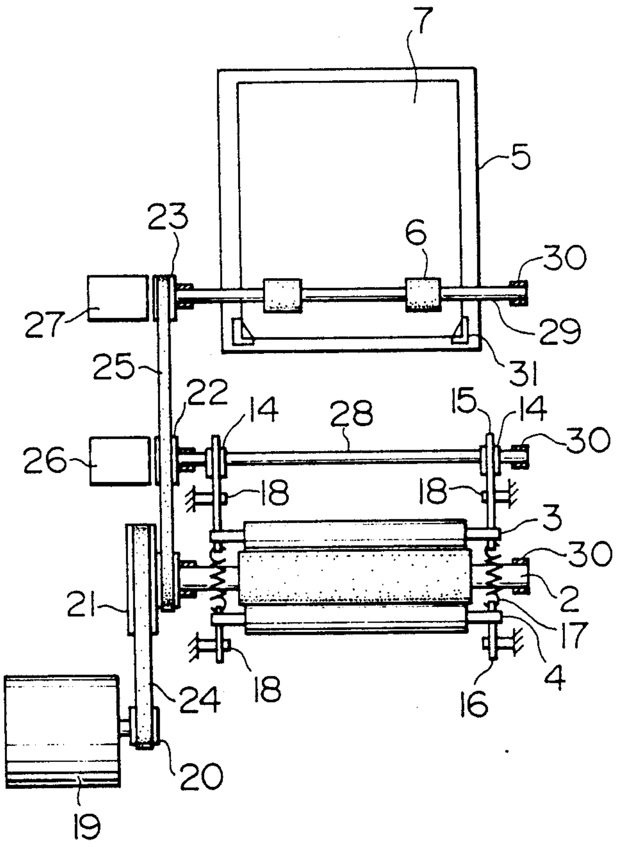
FIG. 1C is a schematic plan view showing an entire thermal printing system including the platen shown in FIG. 1A.
Figure 2:
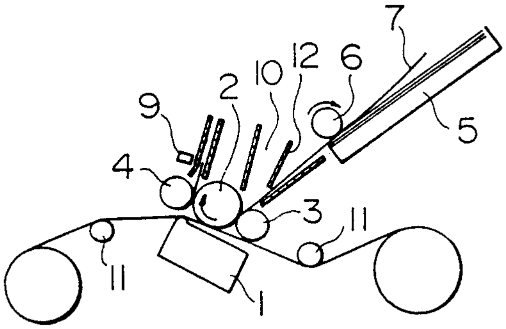
FIGS. 2, 3, 4 and 5 are schematic side views showing the manner of feeding a paper sheet to and adjacent to the platen of the printing system shown in FIG. 1A.

FIG. 1C is a schematic plan view of the entire part of the thermal printing system including the platen as shown in FIG. 1B.

In FIG. 1C, numeral 19 denotes a motor, numerals 20 through 23 are pulleys, similarly, 24 and 25 are belts, 26 27 are electro-magnetic clutches, 28 and 29 are shafts, 30 is a bearing and 31 is a pair of corner pieces for preventing a paper sheet from escaping laterally outside the cassette. The pulley 23 and the shaft 29 are connected via an electro-magnetic clutch 27, while the shaft 29 and the paper feed roller 6 are integrally coupled.

Similarly, the pulley 22 and the shaft 28 are connected through a electro-magnetic clutch 26 and the shaft 28 and the cam 14 are integrally coupled.

The motor 19 drives the platen 2 via the pulleys 20, 21 and the belt 24, while the platen 2, pulleys 22 and 23 integrally rotate through the belt 25.

When the electro-magnetic clutches 26 and 27 are turned OFF, the rotation of the motor 19 is not transmitted to the shafts 28 and 29.

As a means for urging the oppositely facing pair of front and rear pinch rollers 3 and 4 against the platen 2, such biasing means as disclosed in the present applicant's copending Japanese Utility Model Application No. Sho 63(1988)-81123 titled "Thermal Printing System" also can be used. Namely, said biasing means comprises, a platen 2, a front and a rear pinch rollers 3 and 4 each being rotatably disposed on each of a pair of oppositely facing pinch roller levers(not shown)and are resilientlY biased against the platen 2 by a pinch roller tension spring(not shown). The platen 2 and the paper feed roller 6 are coupled by a toothed timing belt(not shown)via an electro-magnetic clutch(not shown), wherein the peripheral speed of the platen 2 can be set to be higher than that of the paper feed roller 6.

As a consequence, the paper feed roller 6 will not rotate even if the platen 2 rotates, if only the electro-magnetic clutch is turned OFF.

A paper detecting sensor 9 is a sensor to detect whether the paper sheet is in place for printing or not and is disposed to locate the position of the fed paper bY detecting the frontmost end of the paper sheet.

Explanation will now be made in what manner the thermal printing system shown as the above-mentioned embodiment operates.

FIG. 1A shows the thermal printing system of the present invention in stand-by position, the platen 2 and the paper feed roller 6 concurrently start rotation in clockwise direction, upon starting of the system, thereby a cut sheet paper 7 is propelled out from the cassette case 5 for holding the paper sheet stock.

Figure 3:
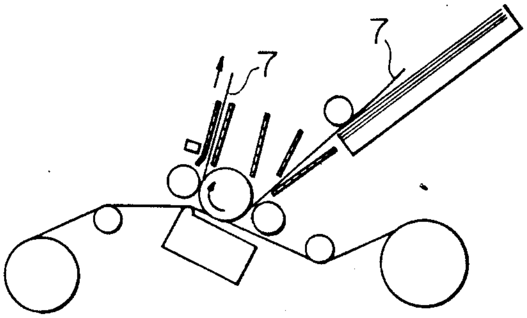

At the moment where the frontmost end of the paper sheet has advanced to the paper detecting sensor 9, the front pinch roller 3 is urged by the cam 14 to move away from the platen 2 as shown in FIGs. 1A and 3.

Figure 4:
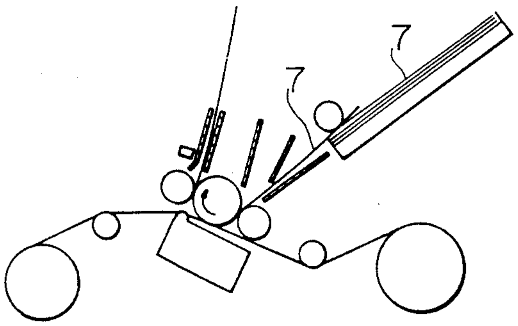
Figure 5:
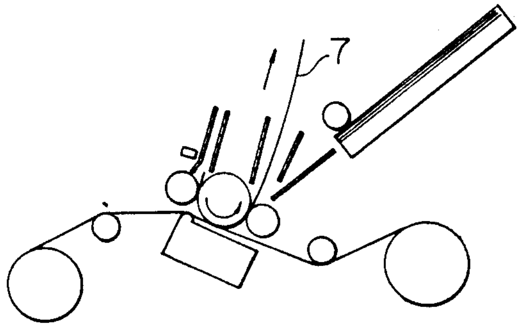

Since the peripheral speed of the platen 2 is set to be larger than that of the paper feed roller 6, the paper sheet 7 fed in the system is tightly stretched between the rear pinch roller 4 and the paper sheet feed roller 6 under the back tension attributable to a kind of brake action given by the paper feed roller 6 and to another tension caused by the mutual friction between the paper being fed and the subsequent paper sheet in the cassette case, resulting in tight contact with the platen 2. The front pinch roller 3 is brought into contact with the platen 2 again, as shown in FIG. 4, immediately before the rearmost end of the paper sheet 7 proceeds on beyond the bottom of the paper feed roller 6, thereby the paper sheet 7 is kept in tight contact with the platen 2.

If the electro-magnetic switch(not shown)is still held ON, the next paper sheet will be fed unwillingly, so the electro-magnetic clutch is turned OFF to avoid such undesired paper feeding. Next, the paper sheet 7 is further advanced just before its rear end extremity arrives at and passes over the front pinch roller 3, then the platen 2 is rotated in reverse direction, that is, anticlockwise direction in this case, so as to receive the fed paper backward into a track through which the paper is placed and set ready for start printing.

Then the thermal head 1 is resiliently urged to contact with the platen 2 for initiating printing step.

When resiliently biasing the paper 7 to the platen 2 by tightly stretching the paper, the electro-magnetic clutch may be turned OFF at the moment the paper detecting sensor detects the frontmost end of the paper.

Under this condition, the paper feed roller 6 will make idle rotation following the paper being propelled, so there exist almost no friction between the paper feed roller 6 and the paper being propelled, however, the paper still can be tightly stretched attributable to the frictional force between the paper being advanced and the next paper received in the cassette, since the sheets of paper 7 remained in the cassette are resiliently urged by the spring 13 toward the paper feed roller 6.

Since the thermal printing system of the present invention is constructed as explained above, following meritorious effects can be obtained.

(1) As it is able to tightly contacts the paper sheet with the platen during the stage of feeding the paper sheet from the cassette, such defects as misaligned print information and slant advancement of the fed paper sheet can be prevented from occuring.

(2) By virtue of using a paper feed roller of the paper holding cassette as a brake means for tightly stretching the fed paper sheet, it is possible to obtain a thermal printing system of simplified construction with low production cost.

While the invention has been particularly shown and described in reference to preferred embodiments thereof, it will be understood by those skilled in the art that changes in form and details may be made therein without departing from the spirit and scope of the invention.

What is claimed is:

1. A thermal printing system, comprising:

a platen;

a pair of pinch rollers one end of each of which is rotatably supported by each one of a pair of pinch roller levers and is resiliently biased by a pinch roller lever tensioning spring so that each pinch roller can be brought into tight contact with said platen;

a paper stock holding cassette case having an upper face portion, said cassette case being attached to a paper feed roller at said upper face portion thereof for feeding paper stock for printing, wherein the peripheral speed of said platen is set higher than that of the peripheral speed of said paper feed roller of the paper holding cassette case to thereby have said paper feed roller of said cassette case act as a brake for tightly stretching said paper when said paper is propelled through said platen.

2. A thermal printing system as claimed in claim 1, wherein said paper feed roller has a driver and said paper feed roller can be released from said driver immediately after the frontmost end of said paper has been caught by one of said pinch rollers to thereby form a frictional force between the paper being fed and papers in said cassette case as a back tension for tightly stretching the paper being fed.

3. A thermal printing system as claimed in claim 1, further comprising a sensor means for detecting a frontmost end portion of said paper; and a cam means for urging one of said paper of pinch rollers located near said cassette case and moving said pair of pinch rollers away from said platen when the frontmost end portion of said paper has advanced to said sensor means to thereby having said paper feed roller and another one of said pair of pinch rollers grip said paper therebetween.

* * * * *